(12) United States Patent
Andersson et al.

(10) Patent No.: US 10,041,404 B2
(45) Date of Patent: Aug. 7, 2018

(54) INTERNAL COMBUSTION ENGINE

(71) Applicant: VOLVO TRUCK CORPORATION, Göteborg (SE)

(72) Inventors: Arne Andersson, Mölnlycke (SE);
Bincheng Jiang, Göteborg (SE);
Staffan Lundgren, Hindås (SE);
Staffan Johansson, Göteborg (SE);
Bengt Johansson, Lund (SE)

(73) Assignee: Volvo Truck Corporation, Göteborg (SE)

( * ) Notice: Subject to any disclaimer, the term of this patent is extended or adjusted under 35 U.S.C. 154(b) by 116 days.

(21) Appl. No.: 15/106,187

(22) PCT Filed: Dec. 19, 2013

(86) PCT No.: PCT/EP2013/003853
§ 371 (c)(1),
(2) Date: Jun. 17, 2016

(87) PCT Pub. No.: WO2015/090341
PCT Pub. Date: Jun. 25, 2015

(65) Prior Publication Data
US 2016/0333778 A1    Nov. 17, 2016

(51) Int. Cl.
*F02B 75/02* (2006.01)
*F01L 1/047* (2006.01)
(Continued)

(52) U.S. Cl.
CPC .............. *F02B 75/02* (2013.01); *F01L 1/047* (2013.01); *F02B 33/22* (2013.01); *F02B 41/06* (2013.01);
(Continued)

(58) Field of Classification Search
CPC ........ F02B 75/02; F02B 33/22; F02B 75/225; F02B 75/22; F02B 41/06; F02B 2075/027;
(Continued)

(56) References Cited

U.S. PATENT DOCUMENTS

| | | | | |
|---|---|---|---|---|
| 5,542,382 A | * | 8/1996 | Clarke | .................... F01L 9/021 123/51 AA |
| 6,543,398 B1 | | 4/2003 | Roberts et al. | |

(Continued)

FOREIGN PATENT DOCUMENTS

| | | |
|---|---|---|
| CA | 2060203 C | 9/1999 |
| CN | 202431361 U | 9/2012 |

(Continued)

OTHER PUBLICATIONS

International Search Report (dated Aug. 25, 2014) for corresponding International App. PCT/EP2013/003853.

(Continued)

*Primary Examiner* — Joseph Dallo
*Assistant Examiner* — Kurt Liethen
(74) *Attorney, Agent, or Firm* — WRB-IP LLP (57) ABSTRACT

An internal combustion engine including a first set of cylinders includes: a first two-stroke compression cylinder housing a first compression piston connected to a first crank shaft; a first four-stroke combustion cylinder housing a first combustion piston connected to a second crank shaft, the first four-stroke combustion cylinder being configured to receive compressed gas from the first two-stroke compression cylinder; and a first two-stroke expansion cylinder housing a first expansion piston connected to the first crank shaft, the first two-stroke expansion cylinder being configured to receive exhaust gas from the first four-stroke combustion cylinder, wherein the first compression piston is (Continued)

positioned to reach a lower end position within the first compression cylinder and the first expansion piston is positioned to reach an upper end position within the first expansion cylinder when the first combustion piston reaches a lower end position within the first combustion cylinder; wherein the second crank shaft is configured to rotate with a speed of at least twice the speed of the first crank shaft.

14 Claims, 7 Drawing Sheets

(51) Int. Cl.

| | | |
|---|---|---|
| *F02B 33/22* | (2006.01) | |
| *F02B 41/06* | (2006.01) | |
| *F02B 75/22* | (2006.01) | |
| *F16C 3/06* | (2006.01) | |
| *F16C 3/20* | (2006.01) | |
| *F01B 1/04* | (2006.01) | |

(52) U.S. Cl.
CPC ............ *F02B 75/22* (2013.01); *F02B 75/225* (2013.01); *F16C 3/06* (2013.01); *F16C 3/20* (2013.01); *F01B 1/04* (2013.01); *F02B 2075/025* (2013.01); *F02B 2075/027* (2013.01); *F16C 2360/22* (2013.01)

(58) Field of Classification Search
CPC ........ F02B 2075/025; F16C 3/06; F16C 3/20; F16C 2360/22; F01L 1/047; F01B 1/04
See application file for complete search history.

(56) References Cited

U.S. PATENT DOCUMENTS

| | | | |
|---|---|---|---|
| 6,880,501 B2* | 4/2005 | Suh .................... | F02B 11/00 |
| | | | 123/58.8 |
| 2010/0077987 A1 | 4/2010 | Voisin | |
| 2010/0300385 A1 | 12/2010 | Durrett et al. | |
| 2011/0226224 A1 | 9/2011 | Dean | |
| 2011/0303202 A1 | 12/2011 | Moser et al. | |

FOREIGN PATENT DOCUMENTS

| | | |
|---|---|---|
| FR | 2 444 161 A1 | 7/1980 |
| GB | 2264333 A | 8/1993 |
| WO | 9621804 A1 | 7/1996 |
| WO | 99/06682 A2 | 2/1999 |

OTHER PUBLICATIONS

Japanese Official Action (dated Nov. 17, 2017) for correspondng Japanese App. 2016-541436.
Chinese Official Action (Apr. 18, 2018) for corresponding Chinese App. 201380081729.X.

* cited by examiner

INTERNAL COMBUSTION ENGINE

BACKGROUND AND SUMMARY

The present invention relates to an internal combustion engine. The invention is applicable on vehicles, in particularly heavy vehicles, such as e.g. trucks. However, although the invention will mainly be described in relation to a truck, the internal combustion engine is of course also applicable for other type of vehicles, such as cars, industrial construction machines, wheel loaders, etc.

For many years, the demands on internal combustion engines have been steadily increasing and engines are continuously developed to meet the various demands from the market. Reduction of exhaust gases, increasing engine efficiency, i.e. reduced fuel consumption, and lower noise level from the engines are some of the criteria that becomes an important aspect when choosing vehicle engine.

Furthermore, in the field of trucks, there are applicable law directives that have e.g. determined the maximum amount of exhaust gas pollution allowable. Still further, a reduction of the overall cost of the vehicle is important and since the engine constitutes a relatively large portion of the total costs, it is natural that also the costs of engine components are reduced.

In order to meet the described demands, various engine concepts have been developed throughout the years where conventional power cylinders have been combined with e.g. a pre-compression stage and/or an expansion stage.

US 2010/0300385 describes an internal combustion engine that aims at providing an increased thermodynamic efficiency by recovery of chemical energy and thus reducing engine emissions. The internal combustion engine disclosed in US 2010/0 300 385 comprises a compressor cylinder which is in upstream fluid communication with a first and a second power cylinder. The power cylinders are in turn in upstream fluid communication with an expander cylinder.

Although the internal combustion engine disclosed in US 2010/0300 385 may increase the thermodynamic efficiency and reduces engine emissions, it is still in need of further improvements, such as e.g. cost efficiency and functionality.

It is desirable to provide an internal combustion engine having reduced number of components and still providing a well-balanced engine.

According to a first aspect of the present invention there is provided an internal combustion engine comprising a first set of cylinders comprising a first two-stroke compression cylinder housing a first compression piston connected to a first crank shaft; a first four-stroke combustion cylinder housing a first combustion piston connected to a second crank shaft, the first four-stroke combustion cylinder being configured to receive compressed gas from the first two-stroke compression cylinder; and a first two-stroke expansion cylinder housing a first expansion piston connected to the first crank shaft, the first two-stroke expansion cylinder being configured to receive exhaust gas from the first four-stroke combustion cylinder; wherein the first compression piston is positioned to reach a lower end position within the first compression cylinder and the first expansion piston is positioned to reach an upper end position within the first expansion cylinder when the first combustion piston reaches a lower end position within the first combustion cylinder; wherein the second crank shaft is configured to rotate with a speed of at least twice the speed of the first crank shaft.

A compression cylinder should in the following and throughout the entire description be interpreted as a cylinder housing a compression piston, where the cylinder is arranged to provide compressed intake gas to a combustion cylinder. Accordingly, the compression piston compresses gas inside the compression cylinder, which compressed gas thereafter is transferred to the intake of the combustion cylinder. The pressure level of the compressed gas is then above atmospheric pressure. The first compression cylinder works in a two-stroke fashion, meaning that when the compression piston is in an upper end position of the cylinder, also known as a top dead centre of the cylinder, gas is provided into the cylinder during the downward motion of the compression piston to a lower end position of the compression cylinder, also known as a bottom dead centre of the cylinder. When the compression piston thereafter is in an upward motion towards the upper end position of the cylinder, the gases provided into the cylinder is compressed due to the volume reduction within the cylinder caused by the reciprocating motion of the compression piston. At a desired point in time, the compressed gases are directed out from the compression cylinder and to the intake of the combustion cylinder. A further description of how this is controlled will be given below. The gas which is compressed by the compression cylinder may, for example, be ambient air.

An expansion cylinder should in the following and throughout the entire description be interpreted as a cylinder housing an expansion piston, where the cylinder is arranged to receive exhaust gases from the combustion cylinder and thereafter further provide the exhaust gases out from the expansion cylinder. The first expansion cylinder works in a two-stroke fashion, meaning that when the expansion piston is in an upper end position of the cylinder, exhaust gas from the combustion cylinder is provided into the expansion cylinder during the downward motion of the expansion piston to a lower end position of the expansion cylinder. Hereby, the exhaust gases are expanded due to the increase of the volume within the cylinder bore in which the expansion piston is reciprocating. When the expansion piston thereafter is in an upward motion towards the upper end position of the cylinder, the exhaust gases provided into the expansion cylinder are directed out from the expansion cylinder, either directly to the atmosphere, or provided to some sort of gas after treatment system, such as e.g. a catalyst or the like.

The combustion cylinder is, as described above, a four-stroke combustion cylinders, i.e. it has one power stroke and one exhaust stroke for every two revolution of the second crank shaft. When the combustion piston in the combustion cylinder is travelling downwards, towards a bottom dead centre of the cylinder, the compressed gas from the compression cylinder is forced into the combustion cylinder. When the combustion piston thereafter is travelling upwards toward a top dead centre of the combustion cylinder, the gases in the combustion cylinder are compressed. At the top dead centre, preferably slightly after the piston has reached the top dead centre, the combustion process is performed. The combustion piston thereafter, again, traveling downwards towards the bottom dead centre for producing work of the piston. Finally, when the combustion piston is travelling upwards, the exhaust gases are directed out from the combustion cylinder and forced into the expansion cylinder.

The present invention is based on the insight that by arranging the pistons to reciprocate in their respective cylinders in relation to each other in the specific configuration, the movement of the pistons and their respective connecting rod has an improved balancing effect of the internal combustion engine configuration. More specifically, the four-stroke combustion piston gives rise to a first-order unbalance of the internal combustion engine, while the two-stroke compression piston and the two-stroke expansion piston give rise to a second-order unbalance of the internal combustion engine. The second-order unbalance has twice the frequency of the first-order unbalance. By positioning the four-stroke combustion cylinder on a separate crank shaft in relation to the two-stroke compression and expansion cylinders, and arranging the second crank shaft to rotate with a speed of at least twice the speed of the first crank shaft, the two-stroke compression and expansion cylinders and the four-stroke combustion cylinder match each other in such a way that the first-order unbalance counteract the second-order unbalance of the internal combustion engine. In further detail, the second order unbalance from the two-stroke compression and expansion cylinders are, with the above configuration, in phase, opposed and lined up with the first order unbalance from the four-stroke combustion cylinders, which unbalances then having roughly the same amplitude and can thus be used to extinguish each other. Hence, the first-order unbalance at least partly extinguishes the second-order unbalance, and vice versa, by means of the faster four-stroke combustion piston acting as balancing weight for the second order unbalance. The first combustion piston is preferably positioned between the first compression piston and the first expansion piston. With the above configuration, the invention hence provide for a piston arrangement which is aligned in its motion to enable the first order unbalances to extinguish the second order unbalances.

The wording "at least twice the speed" should be interpreted in such a way that the second crank shaft should rotate with a speed having a multiple integer of at least two. When the second crank-shaft rotates with twice the speed of the first crank shaft, the four-stroke combustion pistons complete a full combustion cycle, which as described above is 720 crank angle degrees, when the compression pistons and the expansion pistons each completes a full compression and expansion cycle, respectively. To transfer the torque from the first crank shaft and the second crank shaft to e.g. the gearbox transmission, and to synchronize the crank shafts, the first crank shaft may be connected to the second crank shaft by means of e.g. a suitable transmission. Further, the wording "upper end position" and "lower end position" should not be construed as an absolute upper and lower point in the cylinders, but rather a position which can be interpreted with normal tolerances from the respective upper and lower end points.

An advantage of the invention is that by at least partly extinguishing unbalances of the internal combustion engine, the number of conventional balance shafts may be reduced. Accordingly, a reduction of balance shafts is provided which in turn reduces the cost of the engine, since fewer components are needed. The reduction of balancing shafts in the internal combustion engine also minimizes power losses in terms of e.g. friction losses etc. Also, the space in the engine compartment is relatively restricted and by reducing the number of balance shafts, the engine may be made smaller in size which allows for other components to be accommodated in the engine compartment, such as e.g. various hoses or the like.

According to an example embodiment, the internal combustion engine further comprises a second set of cylinders comprising: a second two-stroke compression cylinder housing a second compression piston connected to the first crank shaft, wherein the second compression piston is positioned to reach an upper end position within the second compression cylinder when the first compression piston reaches a lower end position within the first compression cylinder, a second four-stroke combustion cylinder housing a second combustion piston connected to the second crank shaft, the second four-stroke combustion cylinder being configured to receive compressed gas from the second two-stroke compression cylinder, wherein the second combustion piston is positioned to reach an upper end position within the second combustion cylinder when the first combustion piston reaches an upper end position within the first combustion cylinder; and a second two-stroke expansion cylinder housing a second expansion piston connected to the first crank shaft, the second two-stroke expansion cylinder being configured to receive exhaust gas from the second four-stroke combustion cylinder, wherein the second expansion piston is positioned to reach an upper end position within the second expansion cylinder when the first expansion piston reaches a lower end position within the first expansion cylinder.

Hereby, providing the internal combustion engine with a second set of cylinders, the balancing effects of the engine can be even further increased since the specific mutual reciprocating motions of the different pistons may further counteract the unbalances arising during use of the engine. Furthermore, the example embodiment provides for an increased power capability of the internal combustion engine, as well as an improved continuous engine torque.

According to an example embodiment, the first set of cylinders and the second set of cylinders may be positioned in a V-shaped configuration in relation to each other. According to an example embodiment, the V-shape may be arranged in a 90 degrees configuration.

An advantage is that an even further reduction of the unbalances may be provided since the strokes of the pistons within the respective cylinders can be even further controlled in relation to each other. The motion pattern of the pistons and the respective crank shaft has, unexpectedly, turned out to even further balance the internal combustion engine and thereby to an even further extent reduce the need of balance shafts for the engine. Furthermore, the V-shaped configuration of the internal combustion engine allows for further controllability of the first and second order unbalances, since the forces from the cylinders are lined up in such a way that a desired equilibrium of the force is provided. Also, providing the cylinders in a diagonal fashion will enable the two-stroke cylinders to extinguish the first order unbalances arising there from with each other. Still further, the V-shape configuration of the internal combustion engine provides for a compact engine which is advantageous due to the limited available space in the engine compartment. The invention should not be construed as limited to the above 90 degrees; other configurations are of course conceivable, such as e.g. a span between 0 degrees to 120 degrees.

According to an example embodiment, the first compression piston may be positioned to reach an upper end position within the first compression cylinder when the first expansion piston reaches a lower end position within the first expansion cylinder. Hereby, the first compression piston and the second expansion pistons are arranged in their respective upper end position when the second compression piston and the first expansion piston is arranged in their respective lower end positions. An advantage is that, with the piston configuration in combination with the above V-shape, each "leg" of the V-shape has one two-stroke piston is in its upper end position and one two-stroke piston in its lower end position providing a balanced effect due to the control of inertia loading of different pistons.

According to an example embodiment, the first combustion piston and the second combustion piston may be positioned to reach an upper end position within the respective combustion cylinders approximately simultaneously and in such a way that the first combustion piston is configured to be ignited at an upper end position within the first combustion cylinder when the second combustion piston is in an upper end position of the second combustion cylinder for initiation of intake of gas therein.

The wording "crank angle offset" should in the following and throughout the description be interpreted as a rotational difference between crank angles for the different pistons, i.e. the crank angle degrees (CAD) between the pistons on the crank shaft. As an example, the four-stroke combustion pistons have a 720 crank angle cycle while the two-stroke compression and expansion pistons each have a 360 crank angle cycle, respectively.

An advantage of providing the combustion pistons in the above manner, i.e. with approximately 360 degrees offset in relation to each other is that a combustion stroke will occur for every revolution of the second crank shaft, thereby providing a continuous engine torque. The internal combustion engine is off course working well with minor deviation from the 360 degrees offset, which should not be construed as an absolute value of the internal relationship between the first and second combustion pistons.

According to an example embodiment, the first and second combustion pistons may be arranged to reach a lower end position within the first and second combustion cylinder, respectively, when the first expansion piston reaches an upper and a lower position within the first expansion cylinder. This arrangement in combination with the above described piston position relations may even further increase the balance of the internal combustion engine.

According to an example embodiment, the first compression cylinder and the first expansion cylinder may be positioned in parallel in relation to each other, and wherein the second compression cylinder and the second expansion cylinder may be positioned in parallel in relation to each other.

This configuration is especially, but not exclusively, suitable for the above mentioned V-shape configuration of the engine. Hereby, the first compression cylinder and the first expansion cylinder is arranged at one leg of the V-shape, while the second compression cylinder and the second expansion cylinder is arranged at the other leg of the V-shape. By arranging the first compression and expansion cylinders in parallel with each other, and the second compression and expansion cylinders in parallel with each other, as well as arranging the respective pistons to reciprocate according to the above description, the internal combustion engine is even further balanced. Also, by providing the specific cylinders in parallel, the below described passageways between the cylinders can be made relatively small, which reduces the loss of power in these passageways.

According to an example embodiment, the first combustion cylinder and the second combustion cylinder may form a first V-shaped configuration; and the first compression cylinder and the second compression cylinder may form a second V-shaped configuration.

According to an example embodiment, the first crank shaft may be positioned in parallel to the second crank shaft, such that the second V-shaped configuration is positioned above and in parallel with the first V-shaped configuration. In detail, the axial extension of the first crank shaft is positioned in parallel with the axial extension of the second crank shaft.

By providing the internal combustion engine with two V-shapes, and to position the second V-shape above, and in parallel with, the first V-shape, the distance between the first compression cylinder and the first combustion cylinder, as well as the distance between the first combustion cylinder and the first expansion cylinder can be made relatively small, thereby reducing the below described passageways between the cylinders, which reduces the power losses in these passages, thereby increasing the efficiency of the internal combustion engine. Further, the provision of the V-shapes positioning is beneficial since it further increases the balancing properties of the internal combustion engine. This is achieved since the V-shapes provide for a suitable alignment of mass forces between the four-stroke pistons and the two-stroke pistons.

Still further, the wording "above" when discussing the relative position between the first and the second V-shapes should be construed such that the end point of the respective V-shapes are arranged offset to each other. Hereby the second V-shape is more or less housed within the first V-shape.

According to an example embodiment, a balance shaft may be positioned between the first and the second crank shafts. The balance shaft may be arranged in the internal combustion engine as complement to even further remove any unbalance that may arise in the engine. The balance shaft may off course be positioned at other locations of the internal combustion engine as well and is not limited to the above described position. It may however be beneficial to position the balancing shaft in close proximity to the second crank shaft in order to counteract the unbalances provided there from.

According to an example embodiment, the first compression cylinder may be in fluid communication with the first combustion cylinder by means of a first passageway. According to an example embodiment, the first combustion cylinder may be in fluid communication with the first expansion cylinder by means of a second passageway. According to an example embodiment, the second compression cylinder may be in fluid communication with the second combustion cylinder by means of a third passageway. According to an example embodiment, the second combustion cylinder may be in fluid communication with the second expansion cylinder by means of a fourth passageway. According to an example embodiment, the first passageway may be provided with cooling means for cooling the fluid passing between the first compression cylinder and the first combustion cylinder. According to an example embodiment, the third passageway may be provided cooling means for cooling the fluid passing between the second compression cylinder and the second combustion cylinder. By means of the cooling means provided, the power consumption of e.g. the compression cylinder can be reduced, since the pressure level of the cooling means can be increased in comparison to previously known engines. Further, the total compression work will be reduced. A colder internal combustion engine is also provided. The cooling means may e.g. be a heat exchanger or the like.

According to an example embodiment, each of the cylinders may comprise valved inlet ports and valved outlet port for controlling fluid transportation into and out from the respective cylinders, wherein each of the valved inlet ports and valved outlet ports are controlled by means of a common cam shaft.

Due to the different speed of the crank shafts for the different cylinders, one common cam shaft may be sufficient to use, since the cam shaft for a two-stroke cylinder should run at the speed of the two-stroke crank shaft and the cam shaft for the four-stroke cylinders should run with a speed of half the speed of the four-stroke crank shaft. Hereby, due to the speed ratio between the first and second crank shafts described above, one common cam shaft may be enough to use.

According to an example, the compression cylinders may be provided with a reed valve or check valve. In such a case, these cylinders may not need to be controlled by the cam shaft.

Hereby, it is possible to control the fluid transportation by opening and closing the valved outlet ports at suitable intervals. For example, the valved outlet ports of the first compression cylinder may be controlled to be in an opened state when the pressure in the first compression cylinder has reached a predetermined pressure limit. Different types of valved ports are well known to the skilled person and will not be described further. The valved ports can be controlled by means of already available control unit of the engine or vehicle onto which the engine is to be mounted.

According to a second aspect of the present invention there is provided a vehicle comprising an internal combustion engine according to any of the above described embodiments.

Effects and features of this second aspect are largely analogous to those describe above in relation to the first aspect of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional features and advantages of the present invention, will be better understood through the following illustrative and non-limiting detailed description of exemplary embodiments of the present invention, wherein.

DETAIL DESCRIPTION

The present invention will now be described more fully hereinafter with reference to the accompanying drawings, in which exemplary embodiments of the invention are shown. The invention may, however, be embodied in many different forms and should not be construed as limited to the embodiment set forth herein; rather, these embodiments are provided for thoroughness and completeness. Like reference character refer to like elements throughout the description.

Figure 1:
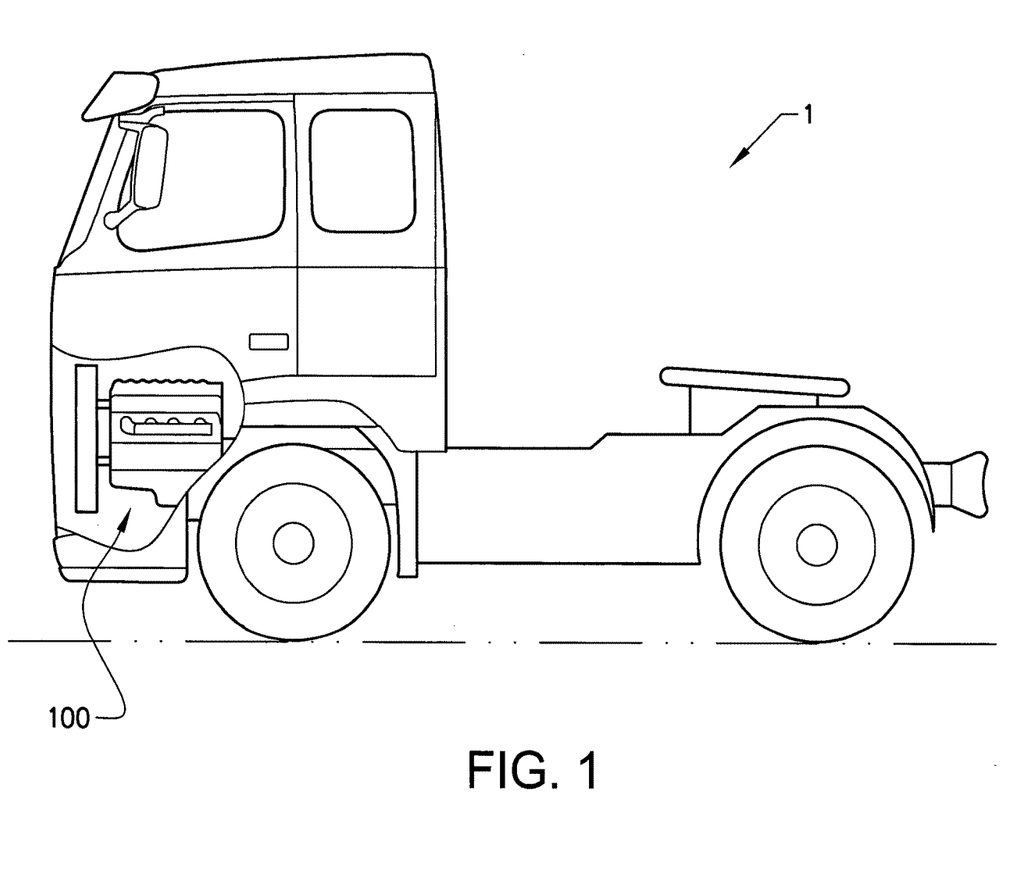
FIG. 1 is a side view of a vehicle comprising an internal combustion engine according to an example embodiment of the present invention.

With particular reference to FIG. 1, there is provided a vehicle 1 with an internal combustion engine 100 according to the present invention. The vehicle 1 depicted in FIG. 1 is a truck for which the inventive internal combustion engine 100, which will be described in detail below, is particularly suitable for.

Figure 2:
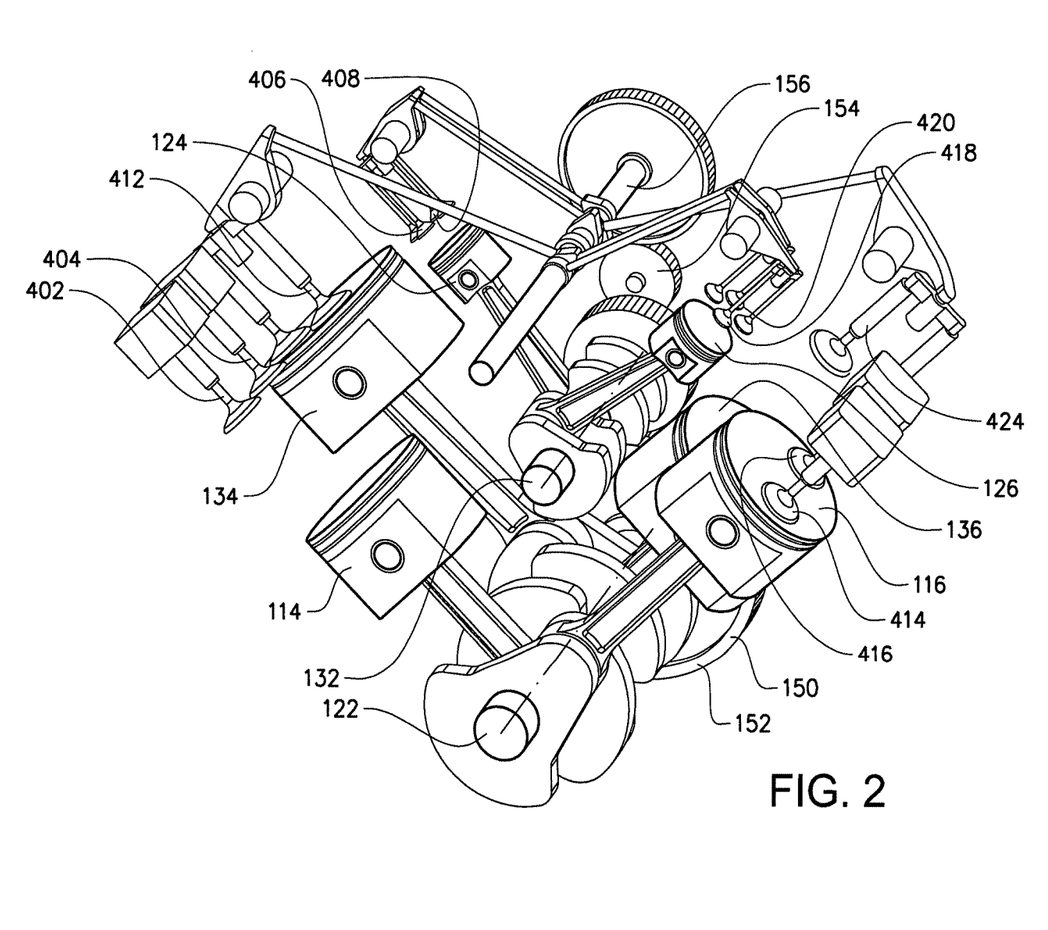
FIG. 2 is a perspective view of the internal combustion engine according to an example embodiment of the present invention.
Figure 3:
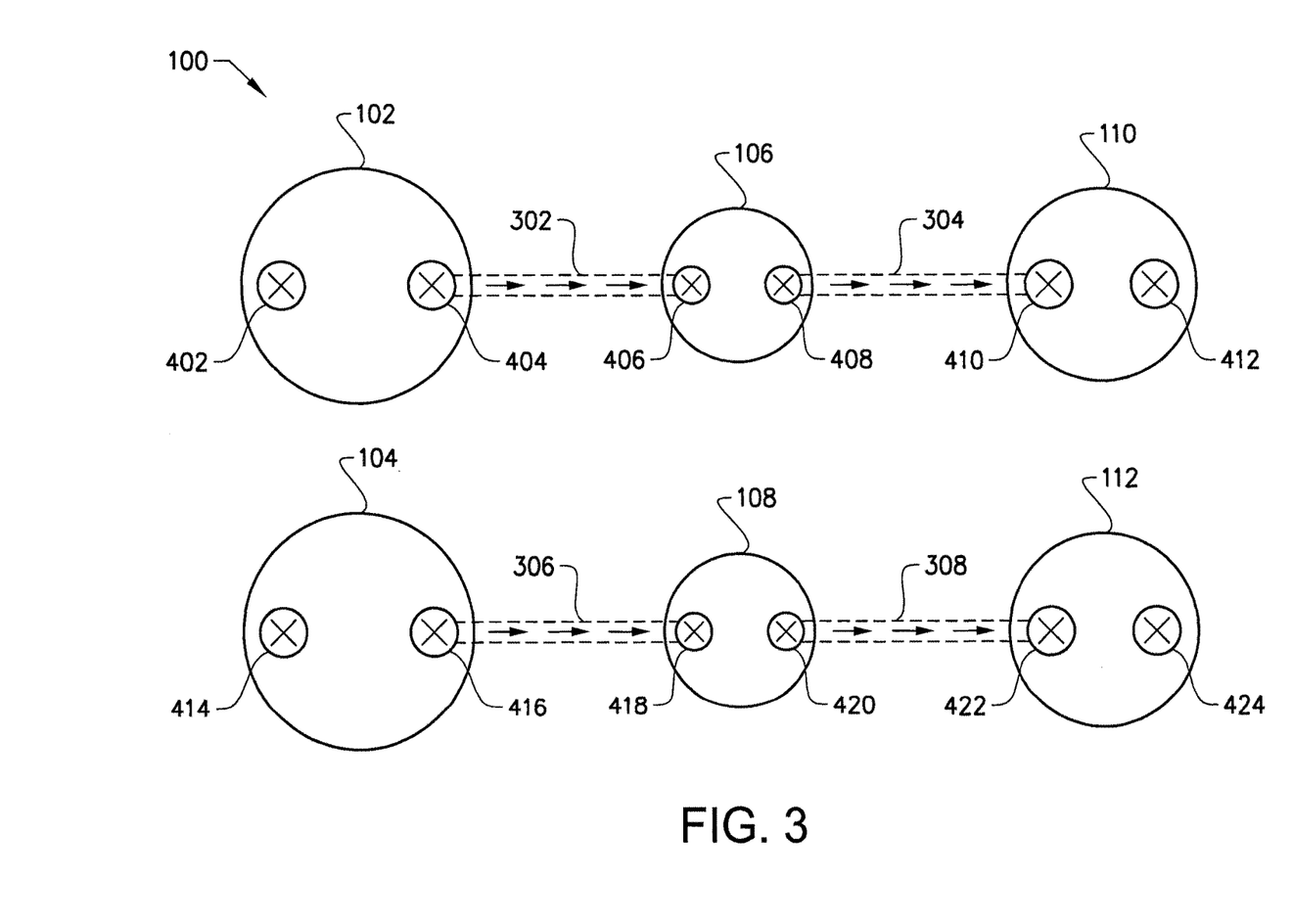
FIG. 3 is a schematic top view of the interconnection between the cylinders in the example embodiment depicted in FIG. 2.

Turning to FIG. 2 in combination with FIG. 3, which illustrates an internal combustion engine 100 according to an example embodiment of the present invention. The internal combustion engine depicted in FIG. 1 is formed in a V-shape comprising six different cylinders and will hence be described in relation to the V-shape. However, the invention is equally applicable with cylinders arranged in parallel with each other, which will be described below in relation to FIGS. 5-7. The cylinders housing the respective piston have been omitted from FIG. 2 for simplicity of understanding the invention and the piston configuration can instead be found in the schematic top view of FIG. 3.

The internal combustion engine as depicted in FIGS. 2 and 3 comprises a first 102 and a second 104 compression cylinder which are in respective fluid communication with a first 106 and a second 108 combustion cylinder. The first 106 and second 08 combustion cylinders are in turn in fluid communication with a first 110 and a second 112 expansion cylinder, respectively.

The first 102 and second 104 compression cylinders each houses a respective first 114 and a second 1 6 compression piston reciprocating in its respective compression cylinder between a lower end position 118, also called the bottom dead centre, and an upper end position 120, also called the upper dead centre. The first 114 and second 116 compression pistons are connected to a respective connecting rod which in turn is connected to a first crank shaft 122 of the internal combustion engine 100.

Likewise, the first 106 and second 108 combustion cylinders each houses a respective first 124 and a second 126 combustion piston reciprocating in its respective combustion cylinder between a lower end position 128 and an upper end position 130. The first 124 and second 126 combustion pistons are connected to a respective connecting rod which in turn is connected to a second crank shaft 132 of the internal combustion engine 100.

Finally, and in a corresponding manner as described in relation to the compression cylinders and the combustion cylinders, the first 10 and second 112 expansion cylinders each houses a respective first 134 and a second 136 expansion piston reciprocating in its respective expansion cylinder between a lower end position 138 and an upper end position 140. The first 134 and second 136 expansion pistons are connected to a respective connecting rod which in turn is connected to the first crank shaft 122 of the internal combustion engine 100.

As can be seen, especially in FIG. 2, and as described above, the cylinders are arranged in a V-shaped configuration. More specifically, the internal combustion engine 100 is constituted by a first and a second V-shaped configuration where the first V-shape is arranged by means of the compression cylinders 102, 104 and the expansion cylinders 110, 112. The second V-shape is arranged by means of the first 106 and second 108 combustion cylinders.

The first compression cylinder 102 is arranged in parallel with the first expansion cylinder 110, and the second compression cylinder 104 is arranged in parallel with the second expansion cylinder 112 in the first V-shaped configuration. Hereby, the first compression cylinder 102 and the first expansion cylinder 110 constitutes one of the legs in the first V-shape configuration, while the second compression cylinder 104 and the second expansion cylinder 112 constitutes the second leg in the first V-shape configuration.

The first combustion cylinder 106 constitutes one of the legs in the second V-shape configuration while the second combustion cylinder 08 constitutes the other leg of the second V-shaped configuration. The first and the second V-shaped configurations are positioned in parallel to each other. Hereby, the second crank shaft 132 is positioned above and in parallel with the first crank shaft 122. Further, the first and the second V-shapes are preferably arranged with the same, or approximately the same, angular spacing. Accordingly, the first combustion cylinder 106 is arranged in parallel, or substantially in parallel, with the first compression cylinder 102 and the first expansion cylinder 110.

The second crank shaft 132 is configured to rotate with a speed of a multiple integer of at least two in comparison to the first crank shaft 122. The following will, for simplicity of understanding, only describe the case where the second crank shaft 132 rotates with twice the speed of the first crank shaft 122.

The second crank shaft 132 rotates with twice the speed of the first crank shaft 122. Hereby, the four-stroke combustion cylinders, which are connected to the second crank shaft 132 performs a full four-stroke cycle, i.e. 720 degrees crank angle cycle, when the two-stroke compression and expansion cylinders performs a full two-stroke cycle, i.e. 360 degrees crank angle cycle. The first 122 and second 132 crank shafts are interconnected to each other by means of a suitable transmission 150 having a ratio of 1:2 for transmitting the engine torque to e.g. a gearbox of the vehicle 1. The transmission depicted in FIG. 2 is a gear transmission having a first gear wheel 152 connected to the first crank shaft 122 and a second gear wheel 154 connected to the second crank shaft 132, where the first 152 and second 154 gear wheels are in meshed connection with each other. Other types of transmissions are of course conceivable, such as e.g. a belt transmission, or other types which are well known to the skilled person.

Moreover, the transmission is further connected to a cam shaft 156 of the internal combustion engine. The cam shaft 156 controls the various valves, which function will be described below, of the different cylinders. There is one single cam shaft controlling the valves for all cylinders of the internal combustion engine in the example embodiment depicted in FIG. 2. This is achievable due to the mutual speed/stroke configurations of the pistons and their respective crank shafts.

Figure 4:
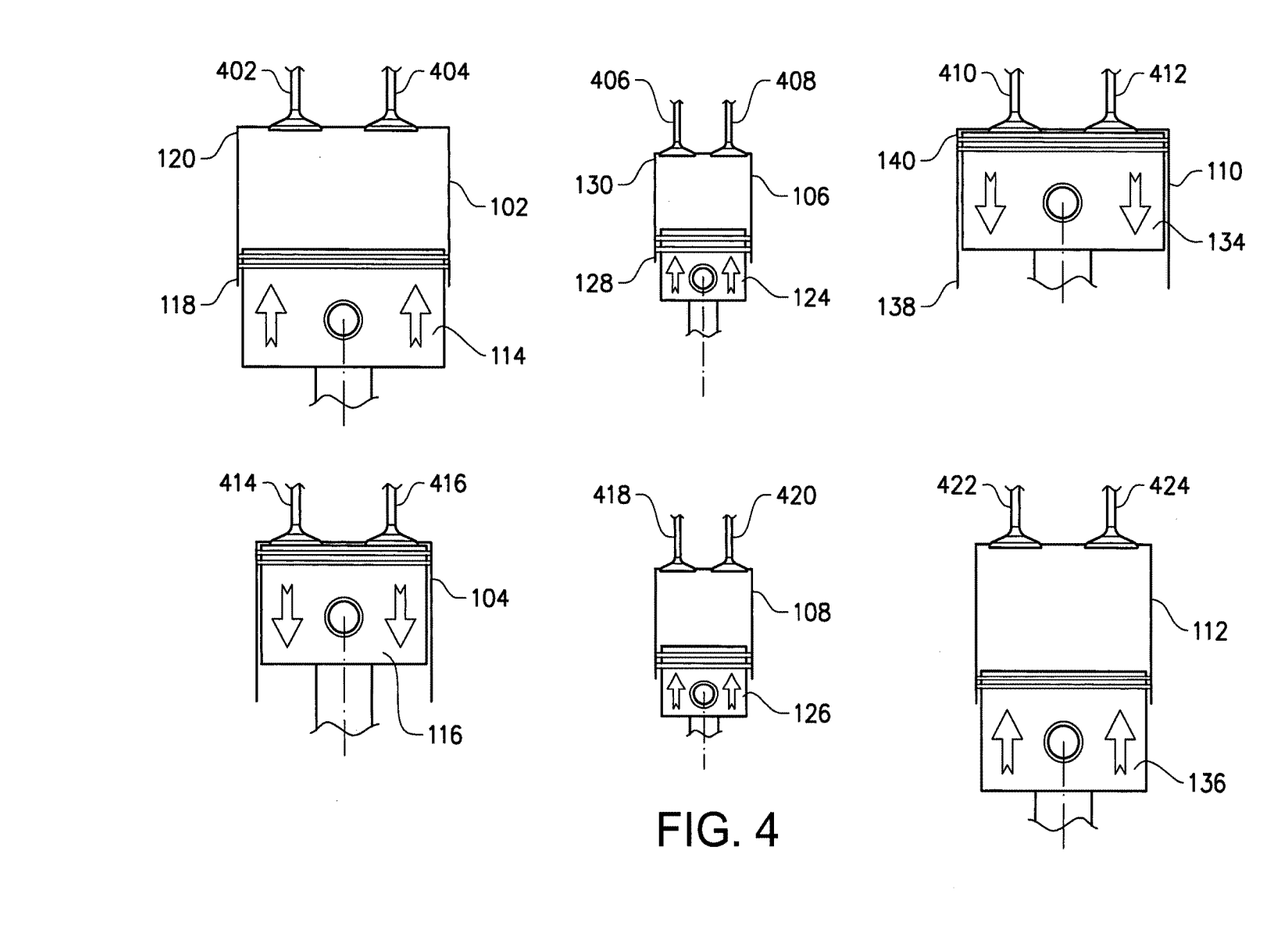
FIG. 4 is schematic side view of the piston motion in the respective cylinders of the example embodiment depicted in FIGS. 2 and 3.

In order to describe the motion pattern of the different cylinders and the communication between the different cylinders during use of the internal combustion engine, reference is made to FIG. 3 in combination with FIG. 4. As is depicted in FIG. 3, the first compression cylinder 102 is in fluid communication with the first combustion cylinder 106 by means of a first passageway 302, and the first combustion cylinder is in fluid communication with the first expansion cylinder 110 by means of a second passageway 304. Likewise, the second compression cylinder 104 is in fluid communication with the second combustion cylinder 108 by means of a third passageway 306, and the second combustion cylinder 108 is in fluid communication with the second expansion cylinder 112 by means of a forth passageway 308. The first 302 and third 306 passageways may be provided with cooling means (not shown) for cooling the gases transported there through.

As illustrated in FIG. 4, during motion of the internal combustion engine, the first compression piston 114 is positioned in the first compression cylinder 102 to reach a lower end position 118 within the first compression cylinder 102 when the second compression piston 116 reaches an upper end position 120 within the second compression cylinder 104. The first combustion piston 124 is positioned in the first combustion cylinder 106 to reach a lower 128 end position within the first combustion cylinder 106 when the second combustion piston 126 reaches a lower end position 128 within the second combustion cylinder 108. The first expansion piston 134 is positioned to reach an upper end position 140 within the first expansion cylinder 110 when the second expansion piston 136 reaches a lower end position 138 within the second expansion cylinder 112.

To simplify the understanding of the description relating to the compression-combustion-expansion-cycle of the internal combustion engine, the following description will only be made in relation to the first compression cylinder 102, the first combustion cylinder 106, and the first expansion cylinder 110, which together form a first set of cylinders.

Furthermore, when the first compression piston 114 is positioned in its lower end position 118 within the first compression cylinder 102, the first combustion piston 124 is positioned in the lower end position 128 with the first combustion cylinder 106 and the first expansion piston 134 is positioned in the upper end position 140 within the first expansion cylinder 110.

The following will describe each of the four strokes in the compression-combustion-expansion-cycle.

At a first stage, the first compression piston 114 is in the lower end position 118 within the first compression cylinder 102 and in an upward motion towards the upper end position 120 of the first compression cylinder 102. The compression stage is hence initiated in the first compression cylinder 102. The first combustion piston 124 is positioned in the lower end position 128 and in an upward motion towards the upper end position 130 within the first combustion cylinder 106. An outlet valve 408 of the first combustion cylinder 106 is positioned in an opened state such that exhaust gases in the first combustion cylinder 106 can be forced into the first expansion cylinder 110 during the upward motion of the first combustion piston 124. Furthermore, during the first stage, the first expansion piston 134 is positioned in an upper end position 140 within the first expansion cylinder 110 and in a downward motion towards the lower end position 138 thereof. Also, an inlet valve 410 of the first expansion cylinder is positioned in an open state to allow the exhaust gases from the first combustion cylinder 106 to be forced into the first expansion cylinder 110. According to one embodiment, the first expansion cylinder only comprises an outlet valve, i.e. no inlet valve 410. Hereby, the exhaust gases from the first combustion cylinder 106 are provided into the first expansion cylinder 110 via the outlet valve 412. At a later stage, which will be described below, the expanded exhaust gases are also expelled from the first expansion cylinder 110 via the outlet valve 412. Accordingly, the outlet valve 412 acts both as inlet valve and as outlet valve for the first expansion cylinder. The same applies for the second expansion cylinder 112 which is further described below.

At a second stage, the first compression piston 114 has reached a mid portion of the first compression cylinder 102. The gases in the first compression cylinder have, during the upward motion from the lower end position 118 to the mid portion, been compressed by the minimizing volume of the cylinder bore. An outlet valve 404 of the compression cylinder 102 is arranged in an open state to allow compressed gas to enter the first combustion cylinder 106. An intake valve 406 of the first combustion cylinder 106 is thus in an open state such that the first combustion cylinder 106 can receive compressed gas from the first compression cylinder 102. An outlet valve 408 of the first combustion cylinder 106 is positioned in a closed state. The first combustion piston 124 is in this second stage positioned in the upper end position 130 of the first combustion cylinder 106 and in a downward motion towards the lower end position 128, during which downward motion the first combustion cylinder 106 receives compressed gas from the first compression cylinder 102. The first expansion piston 134 is in the second stage positioned in a mid portion of the first expansion cylinder 110 and in a downward motion towards the lower end position 38 thereof, with the inlet valve 410 and the outlet valve 412 in a closed state.

At a third stage, the first compression piston 114 is positioned in the upper end position 120 within the first compression cylinder 102, and in a downward motion towards the lower end position 118 thereof. The inlet valve 402 is in an open state and the outlet valve 404 is in a closed state. The compression cylinder 102 is thus initiating intake of gas into the cylinder. The first combustion piston 124 is positioned in the lower end position 128 of the first combustion cylinder and in an upward motion towards the upper end position 130 thereof. Both the inlet valve 406 and the outlet valve 408 of the first combustion cylinder 106 are in a closed state. The first expansion piston 134 is positioned in the lower end position 138 of the first expansion cylinder 110 and in an upward motion towards the upper end position 140 of the first expansion cylinder 110. The outlet valve 412 of the first expansion cylinder 110 is in an open state to allow expanded exhaust gases to be expelled there from.

Finally, at a fourth stage, the first compression piston 114 is positioned in the mid portion of the first compression cylinder 102 and in a downward motion towards the lower end position 118 of the first compression cylinder 102. The inlet valve 402 of the first compression cylinder is still in an open state to further allow gas to enter the cylinder. The first combustion piston 124 is positioned in the upper end position 130 within the first combustion cylinder 106. The combustion piston 124 is in a downward motion towards the lower end position 128 thereof and is thus in a power stroke. Both the inlet valve 406 and the outlet valve 408 of the first combustion cylinder are arranged in a closed state. The first expansion piston 134 is positioned in the mid portion of the first expansion cylinder 110 and in an upward motion towards the upper end position 140 thereof. The outlet valve 412 of the first expansion cylinder is still in an open state allowing expanded exhaust gases to be expelled there from.

The above has mainly been described in relation to the V-shaped engine as depicted in FIG. 2. The following will now describe the present invention in relation to FIGS. 5-7, illustrating different embodiments of the present invention where all of the different cylinders of the internal combustion engine are positioned in parallel with each other.

Figure 5:
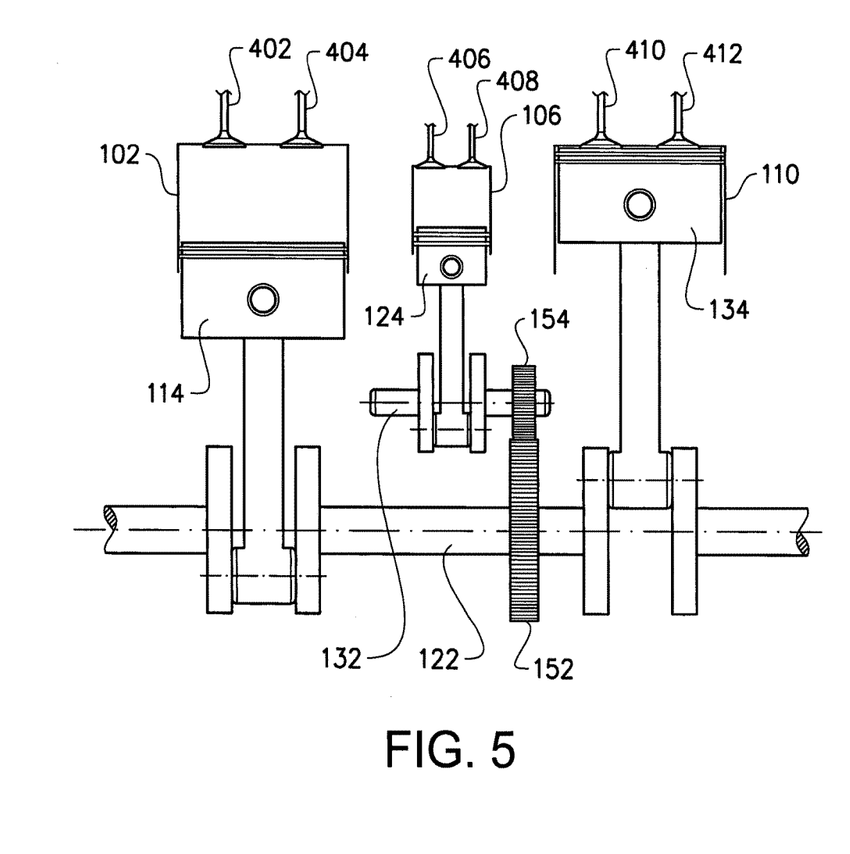
FIG. 5 is a side view of a cylinder configuration according to another example embodiment of the present invention.

Starting with FIG. 5, illustrating a side view of a cylinder configuration according to an example embodiment of the internal combustion engine according to the present invention, where the internal combustion engine is constituted by only the first set of cylinders described above, i.e. the first compression cylinder 102, the first combustion cylinder 106 and the first expansion cylinder 110. The piston arrangement of the embodiment depicted in FIG. 5 is similar as the one described above, i.e. when the first compression piston 114 is positioned in the lower end position 118 of the first compression cylinder 102, the first combustion piston 124 is positioned in the lower end position 128 within the first combustion cylinder 106 and the first expansion piston 134 is positioned in the upper end position 140 within first expansion cylinder 10. Also, the four-stroke configuration described above is equally applicable for the embodiment depicted in FIG. 5.

Furthermore, the first compression cylinder 102, the first combustion cylinder 106 and the first expansion cylinder 110 are arranged in parallel with each other. The first combustion cylinder 106, which is connected to the above described second crank shaft, is arranged between the first compression cylinder 102 and the first expansion cylinder 110, which both are connected to the above described first crank shaft. The second crank shaft 132 is positioned above the first crank shaft 122 when seen from the lateral side of the internal combustion engine. Since the cylinders are arranged in parallel, the length of the second crank shaft 132 is smaller than the distance between the connecting rods connecting the first crank shaft 122 to the respective first compression piston 114 and the first expansion piston 134. A suitable transmission interconnects the first crank shaft 122 to the second crank shaft 132.

Figure 6:
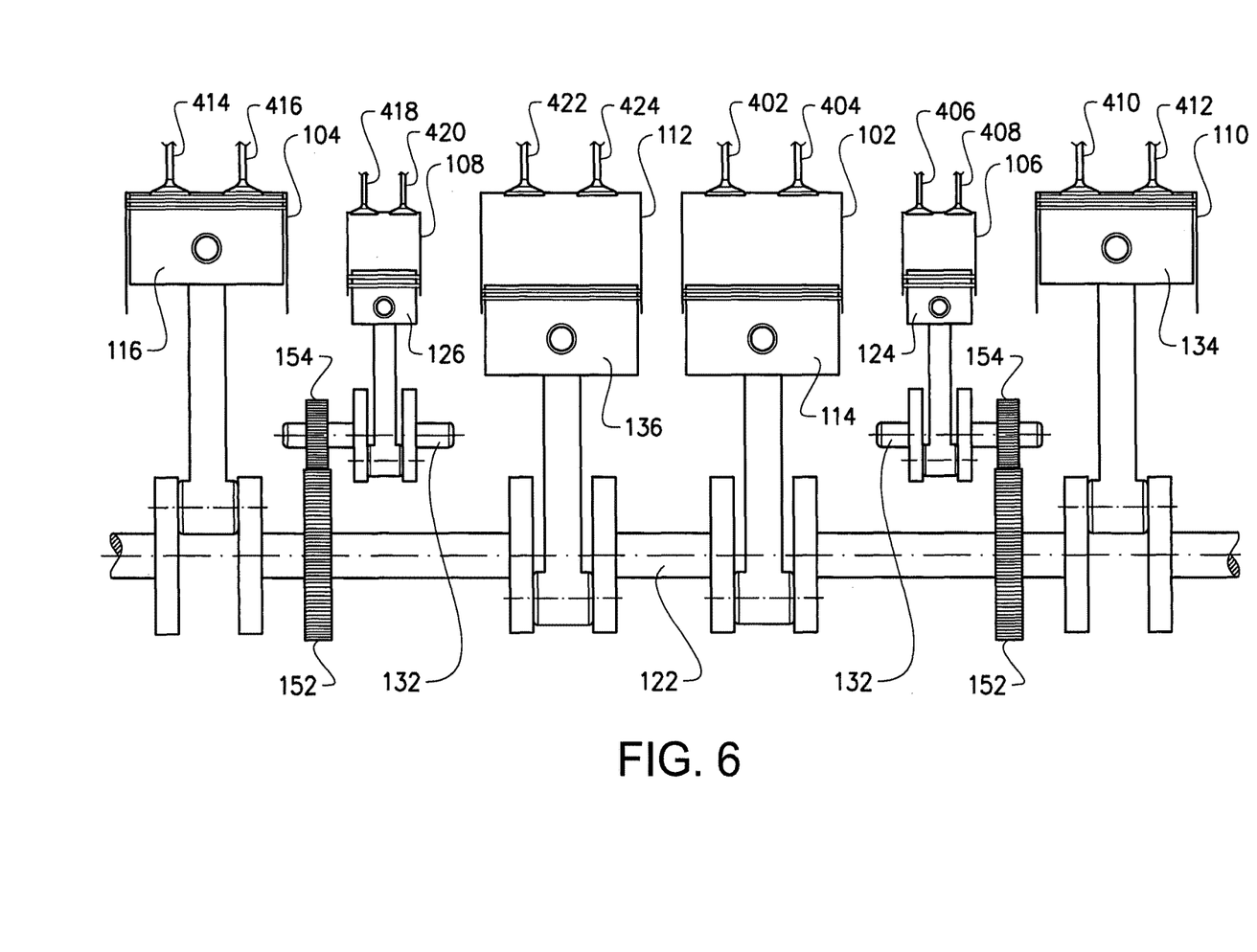
FIG. 6 is a side view of a cylinder configuration according to still another example embodiment of the present invention.
Figure 7:
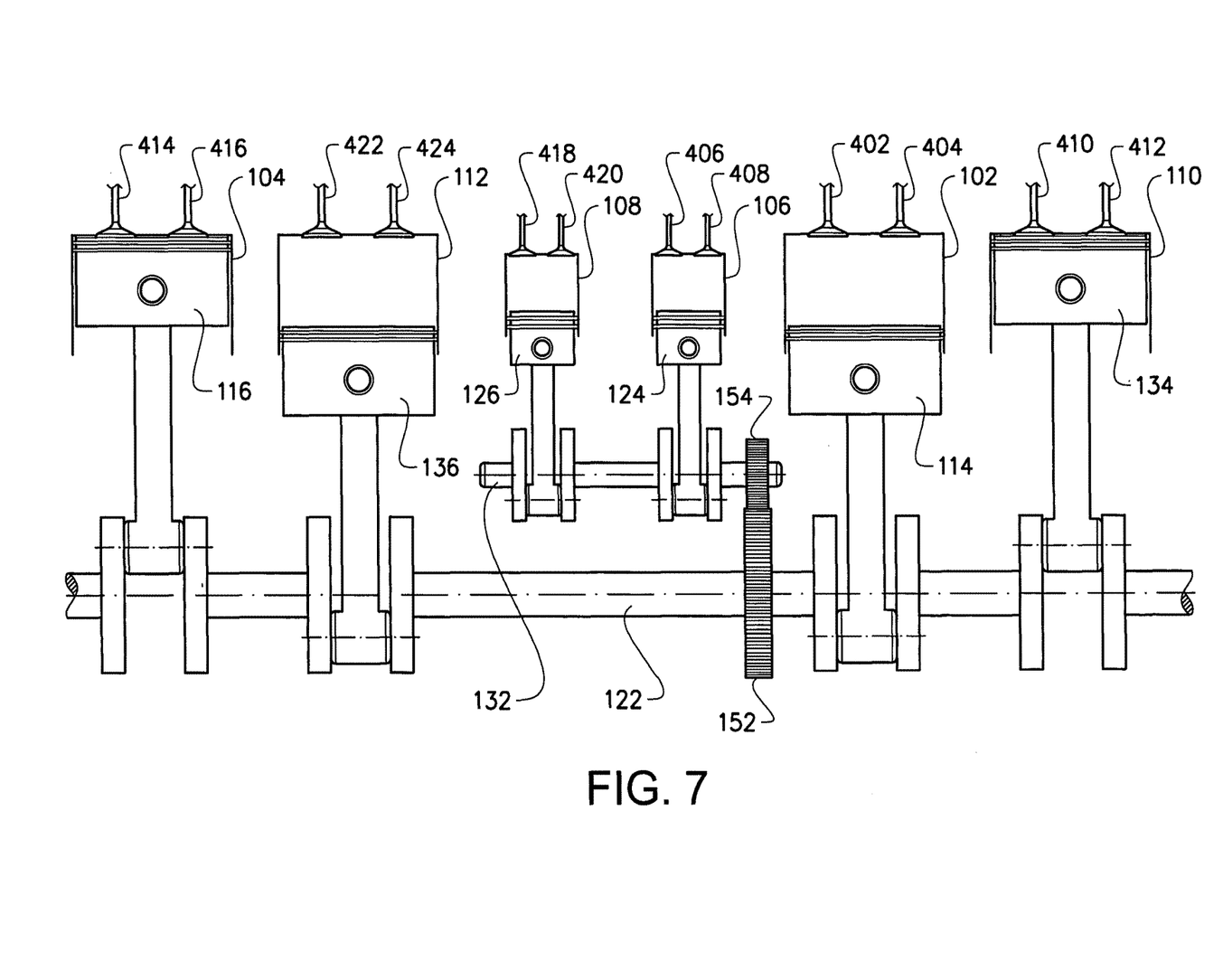
FIG. 7 is a side view of an alternative configuration of the example embodiment depicted in FIG. 6.

Turning now to FIG. 6, illustrating a side view of a cylinder configuration according to a further example embodiment of the internal combustion engine according to the present invention, where the internal combustion engine is constituted by the first and the second set of cylinders as described above. The cylinder arrangement in FIG. 6 comprises the first compression cylinder 102, the first combustion cylinder 106, and the first expansion cylinder 110 in the same manner as described above in relation to FIG. 5. The internal combustion engine depicted in FIG. 6 further comprises the second set of cylinders, i.e. the second compression cylinder 104, the second combustion cylinder 108 and the second expansion cylinder 112 as described above in relation to the V-shaped engine. The cylinder arrangement in FIG. 6 can hence be described as two cylinder arrangement of FIG. 5 positioned next to each other, with the exception that the piston configuration of the second set of cylinders is as described above, i.e. the second compression piston 116 is positioned in an upper end position within the second compression cylinder 104 when the first compression piston 114 is positioned in the lower end position within the first compression cylinder 102, the second combustion piston 126 is positioned in the lower end position within the second combustion cylinder 108 when the first combustion piston 124 is positioned in the lower end position within the first combustion cylinder 106, and the second expansion piston 136 is positioned in a lower end position within the second expansion cylinder 112 when the first expansion piston 134 is positioned in the upper end position within the first expansion cylinder 110.

Moreover, the cylinder arrangement in FIG. 6 comprises two separate second crank shafts 132 and one first crank shaft 122. Both of the second crank shafts 132 are arranged in a similar manner as the second crank shaft described in relation to FIG. 5, i.e. they have a length which is smaller than the distance between the connecting rods connecting the first crank shaft 122 to the respective compression and expansion pistons. Hereby, a suitable transmission connects each of the two second crank shafts to the first crank shaft.

Reference is now made to FIG. 7, which illustrates an alternative example of the embodiment in FIG. 6. The difference between the embodiment of FIG. 7 and the embodiment of FIG. 6 is that the first 106 and the second 108 combustion cylinders are positioned between each other instead of in-between the respective compression and expansion cylinders. The piston configuration is the same as described throughout the application. An advantage of positioning the cylinders as in FIG. 7 is that the first and second combustion pistons can share the same second crank shaft, i.e. the embodiment in FIG. 7 comprises one first crank shaft 122 and one second crank shaft 132.

Although e.g. FIGS. 3 and 4 illustrates that combustion gases from the first 106 and second 108 combustion cylinder are forced into the respective expansion cylinders 110, 112 via the inlet valves 410 and 422, the present invention is equally applicable by having expansion cylinder comprising only one valve. Hereby, the valves 410 and 422 are removed and the combustion gases are provided into the respective expansion cylinder via the outlet valves 412 and 424, which still further expels the expanded gases out from the respective expansion cylinders 110, 112.

It is to be understood that the present invention is not limited to the embodiments described above and illustrated in the drawings; rather, the skilled person will recognize that many changes and modifications may be made within the scope of the appended claims. Also, the invention has been described in relation to cylinders being arranged in parallel in V-shape and it should hence be readily understood that also the corresponding pistons are arranged in parallel and in V-shape when not explicitly described as such.

The invention claimed is:

1. An internal combustion engine comprising a first set of cylinders comprising:
  a first two-stroke compression cylinder housing a first compression piston connected to a first crank shaft;
  a first four-stroke combustion cylinder housing a first combustion piston connected to a second crank shaft, the first four-stroke combustion cylinder being configured to receive compressed gas from the first two-stroke compression cylinder; and
  a first two-stroke expansion cylinder housing a first expansion piston connected to the first crank shaft, the first two-stroke expansion cylinder being configured to receive exhaust gas from the first four-stroke combustion cylinder;
wherein the first compression piston is positioned to reach a lower end position within the first compression cylinder and the first expansion piston is positioned to reach an upper end position within the first expansion cylinder when the first combustion piston reaches a lower end position within the first combustion cylinder; wherein the second crank shaft is configured to rotate with a speed of at least twice the speed of the first crank shaft
  wherein the internal combustion engine further comprises a second set of cylinders comprising:
    a second two-stroke compression cylinder housing a second compression piston connected to the first crank shaft, wherein the second compression piston is positioned to reach an upper end position within the second compression cylinder when the first compression piston reaches a lower end position within the first compression cylinder;
    a second four-stroke combustion cylinder housing a second combustion piston connected to the second crank shaft, the second four-stroke combustion cylinder being configured to receive compressed gas from the second two-stroke compression cylinder;
  wherein the second combustion piston is positioned to reach an upper end position within the second combustion cylinder when the first combustion piston reaches an upper end position within the first combustion cylinder; and
    a second two-stroke expansion cylinder housing a second expansion piston connected to the first crank shaft, the second two-stroke expansion cylinder being configured to receive exhaust gas from the second four-stroke combustion cylinder,
  wherein the second expansion piston is positioned to reach an upper end position within the second expansion cylinder when the first expansion piston reaches a lower end position within the first expansion cylinder,
  wherein the first combustion cylinder and the second combustion cylinder forming a first V-shaped configuration; and the first compression cylinder and the second compression cylinder forming a second V-shaped configuration.

2. The internal combustion engine according to claim 1, wherein the first combustion piston and the second combustion piston are positioned to reach an upper end position within the respective combustion cylinders approximately simultaneously and in a such a way that the first combustion piston is configured to be ignited at an upper end position within the first combustion cylinder when the second combustion piston is in an upper end position of the second combustion cylinder for initiation of intake of fuel therein.

3. The internal combustion engine according to claim 1, wherein the first and second combustion pistons are arranged to reach a lower end position within the first and second combustion cylinder, respectively, when the first expansion piston reaches an upper and a lower position within the first expansion cylinder.

4. The internal combustion engine according to claim 1, wherein the first compression cylinder and the first expansion cylinder are positioned in parallel in relation to each other; and wherein the second compression cylinder and the second expansion cylinder are positioned in parallel in relation to each other.

5. The internal combustion engine according to claim 1, wherein the first crank shaft is positioned in parallel to the second crank shaft, such that the second V-shaped configuration is positioned above and in parallel with the first V-shaped configuration.

6. The internal combustion engine according to claim 1, wherein a balance shaft is positioned between the first and the second crank shafts.

7. The internal combustion engine according to claim 1, wherein the V-shape is arranged in a 90 degrees configuration.

8. The internal combustion engine according to claim 1, wherein the first compression cylinder is in fluid communication with the first combustion cylinder 06) by means of a first passageway.

9. The internal combustion engine according to claim 1, wherein the first combustion cylinder is in fluid communication with the first expansion cylinder by means of a second passageway.

10. The internal combustion engine according to claim 1, wherein the second compression cylinder is in fluid communication with the second combustion cylinder by means of a third passageway.

11. The internal combustion engine according to claim 1, wherein the second combustion cylinder is in fluid communication with the second expansion cylinder by means of a fourth passageway.

12. The internal combustion engine according to claim 8, wherein each one of the first and third passageways are provided with cooling means for cooling the fluid passing there through.

13. The internal combustion engine according to claim 1, wherein each of the cylinders comprises valved inlet ports and valved outlet ports for controlling fluid transportation into and out from the respective cylinders, wherein each of the valved inlet ports and valved outlet ports are controlled by means of a common cam shaft.

14. A vehicle comprising an internal combustion engine according to claim 1.

\* \* \* \* \*